(12) United States Patent
DeVita et al.

(10) Patent No.: US 10,033,167 B1
(45) Date of Patent: Jul. 24, 2018

(54) HANDHELD CIRCULAR SAWING DEVICE

(71) Applicants: Robert DeVita, Staten Island, NY (US); Jon Loglisci, Staten Island, NY (US)

(72) Inventors: Robert DeVita, Staten Island, NY (US); Jon Loglisci, Staten Island, NY (US)

( * ) Notice: Subject to any disclaimer, the term of this patent is extended or adjusted under 35 U.S.C. 154(b) by 0 days.

(21) Appl. No.: 15/480,591

(22) Filed: Apr. 6, 2017

(51) Int. Cl.
*H02G 1/12* (2006.01)
*B21F 13/00* (2006.01)

(52) U.S. Cl.
CPC ......... *H02G 1/1239* (2013.01); *H02G 1/1229* (2013.01)

(58) Field of Classification Search
CPC ...... H02G 1/1239; H02G 1/1229; B21F 13/00
USPC ...................................... 30/90.44, 92.5, 371
See application file for complete search history.

(56) References Cited

U.S. PATENT DOCUMENTS

| | | | |
|---|---|---|---|
| 2,502,656 A | 4/1950 | Koett | |
| 2,674,027 A | 4/1954 | Kosinski | |
| 2,819,520 A * | 1/1958 | Eyles | H02G 1/1217 30/90.8 |
| 3,093,023 A | 6/1963 | Vail | |
| 3,633,275 A | 1/1972 | Hutchinson | |
| 3,851,387 A * | 12/1974 | Ducret | B21F 13/00 30/90.3 |
| 4,055,097 A | 10/1977 | Ducret | |
| 4,169,400 A * | 10/1979 | Ducret | H02G 1/1297 30/90.3 |
| 4,267,636 A * | 5/1981 | Ducret | H02G 1/1297 30/90.3 |
| 4,359,819 A * | 11/1982 | Ducret | H02G 1/1297 30/90.3 |
| 4,884,339 A * | 12/1989 | Custin | H02G 1/1297 30/90.3 |
| 4,901,438 A * | 2/1990 | Gibney | B23D 45/006 30/90.3 |
| 4,977,671 A * | 12/1990 | Ducret | H02G 1/1297 30/90.2 |
| 5,070,615 A * | 12/1991 | Michael, III | H02G 1/1239 30/90.4 |
| 5,435,029 A * | 7/1995 | Carlson, Jr. | H02G 1/1229 140/123 |
| 5,636,560 A * | 6/1997 | Paul | B26D 1/04 30/90.4 |
| D401,827 S | 12/1998 | Lui | |
| 7,891,097 B2 * | 2/2011 | Hartranft | H02G 1/1297 30/90.3 |

(Continued)

Primary Examiner — Hwei C Payer

(57) ABSTRACT

A handheld circular sawing device for severing armored cable includes a housing. A first plate is coupled to and extends coplanarly with a first side of the housing. A second plate is positioned substantially perpendicular to the first plate along a lower edge of the first plate. The second plate is hingedly coupled by a first end to the first plate proximate to a rear of the housing. A second end of the second plate is positioned proximate to a front of the housing to define a channel. A power module and a motor are coupled to the housing. The motor is operationally coupled to the power module. A blade that is coupled to a shaft of the motor protrudes into the channel. The motor is positioned to rotate the blade coincident with the shaft to longitudinally cut a section of a tubular substrate that is positioned in the channel.

16 Claims, 4 Drawing Sheets

(56) References Cited

U.S. PATENT DOCUMENTS

| | | | |
|---|---|---|---|
| 8,191,266 B2 * | 6/2012 | Ducret ................. | H02G 1/1297 30/90.4 |
| 8,522,440 B2 * | 9/2013 | Ducret ................... | H02G 1/005 30/90.1 |
| 2005/0066528 A1 * | 3/2005 | Ducret ................. | H02G 1/1297 30/90.2 |
| 2012/0124841 A1 | 5/2012 | Ducret | |

* cited by examiner

HANDHELD CIRCULAR SAWING DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

(f) STATEMENT REGARDING PRIOR DISCLOSURES BY THE INVENTOR OR JOINT INVENTOR

Not Applicable

(g) BACKGROUND OF THE INVENTION (1) Field of the Invention.

(2) Description of Related Art including information disclosed under 37 CFR 1.97 and 1.98.

The disclosure and prior art relates to sawing devices and more particularly pertains to a new sawing device for severing armored cable.

(h) BRIEF SUMMARY OF THE INVENTION

An embodiment of the disclosure meets the needs presented above by generally comprising a housing. A first plate is coupled to and extends coplanarly with a first side of the housing. A second plate is positioned substantially perpendicular to the first plate along a lower edge of the first plate. The second plate is hingedly coupled by a first end to the first plate proximate to a rear of the housing. A second end of the second plate is positioned proximate to a front of the housing to define a channel. A power module and a motor are coupled to the housing. The motor is operationally coupled to the power module. A blade that is coupled to a shaft of the motor protrudes into the channel. The motor is positioned to rotate the blade coincident with the shaft to longitudinally cut a section of a tubular substrate that is positioned in the channel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
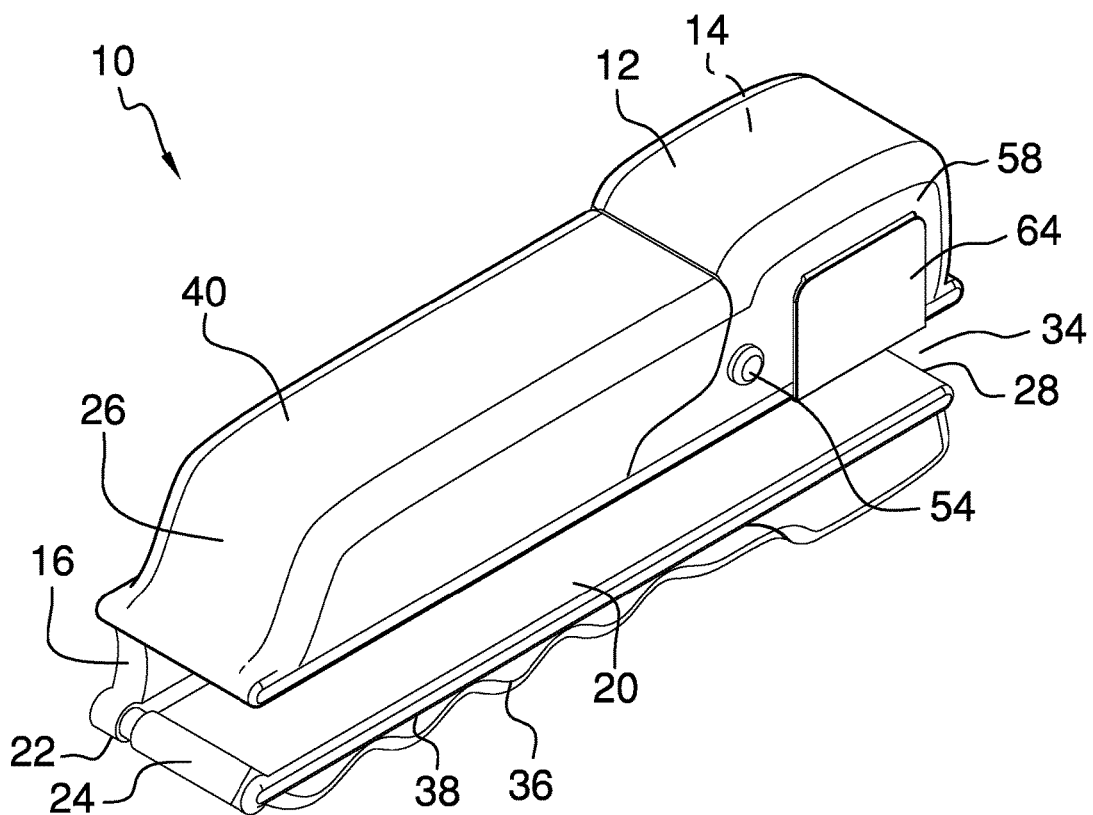
FIG. 1 is an isometric perspective view of a handheld circular sawing device according to an embodiment of the disclosure.
Figure 2:
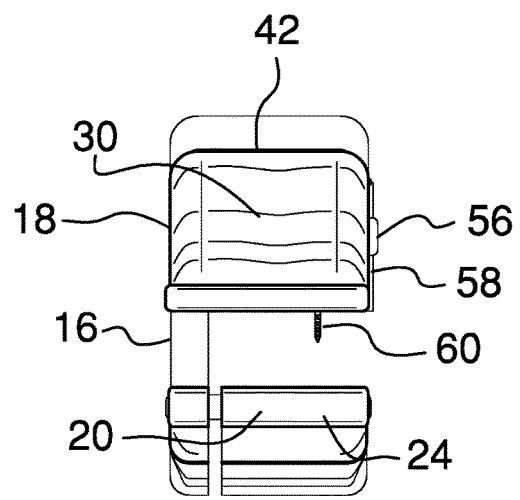
FIG. 2 is a front view of an embodiment of the disclosure.
Figure 3:
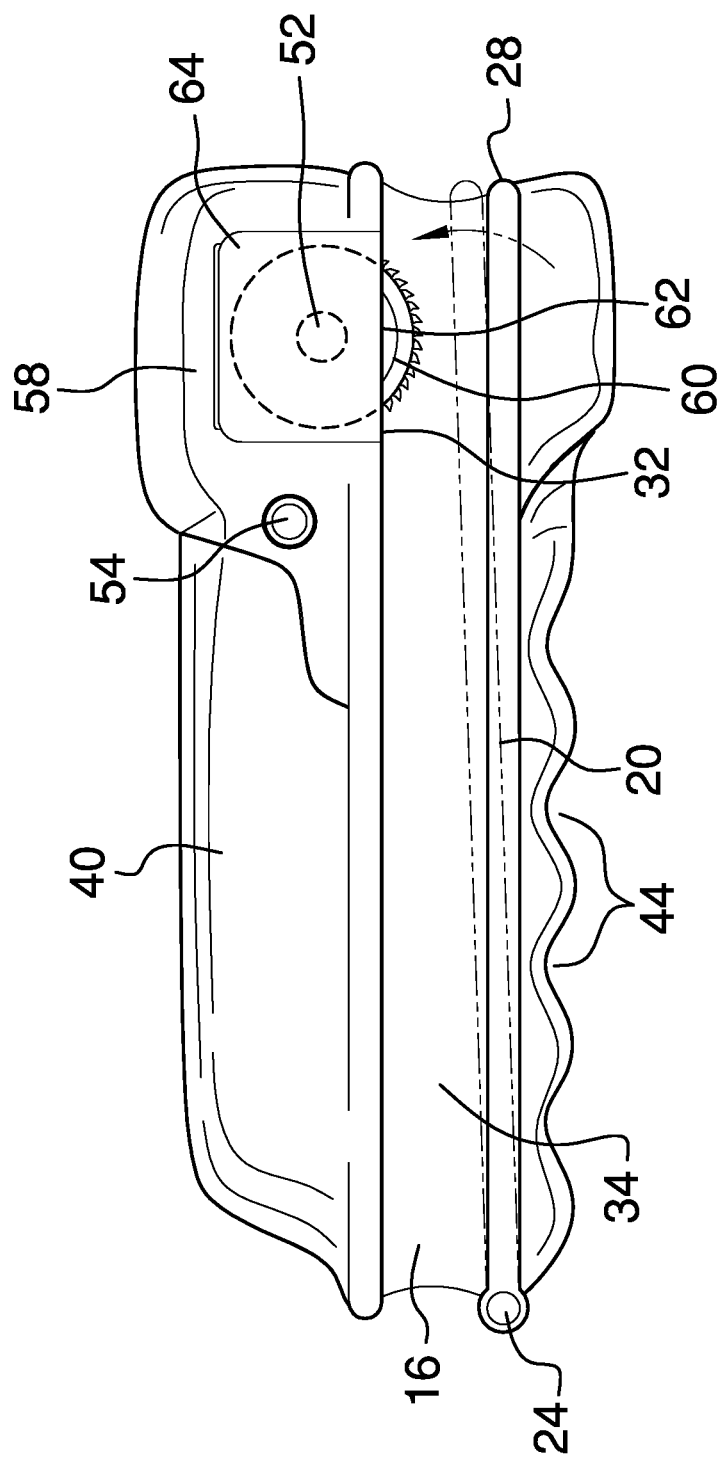
FIG. 3 is a side view of an embodiment of the disclosure.
Figure 4:
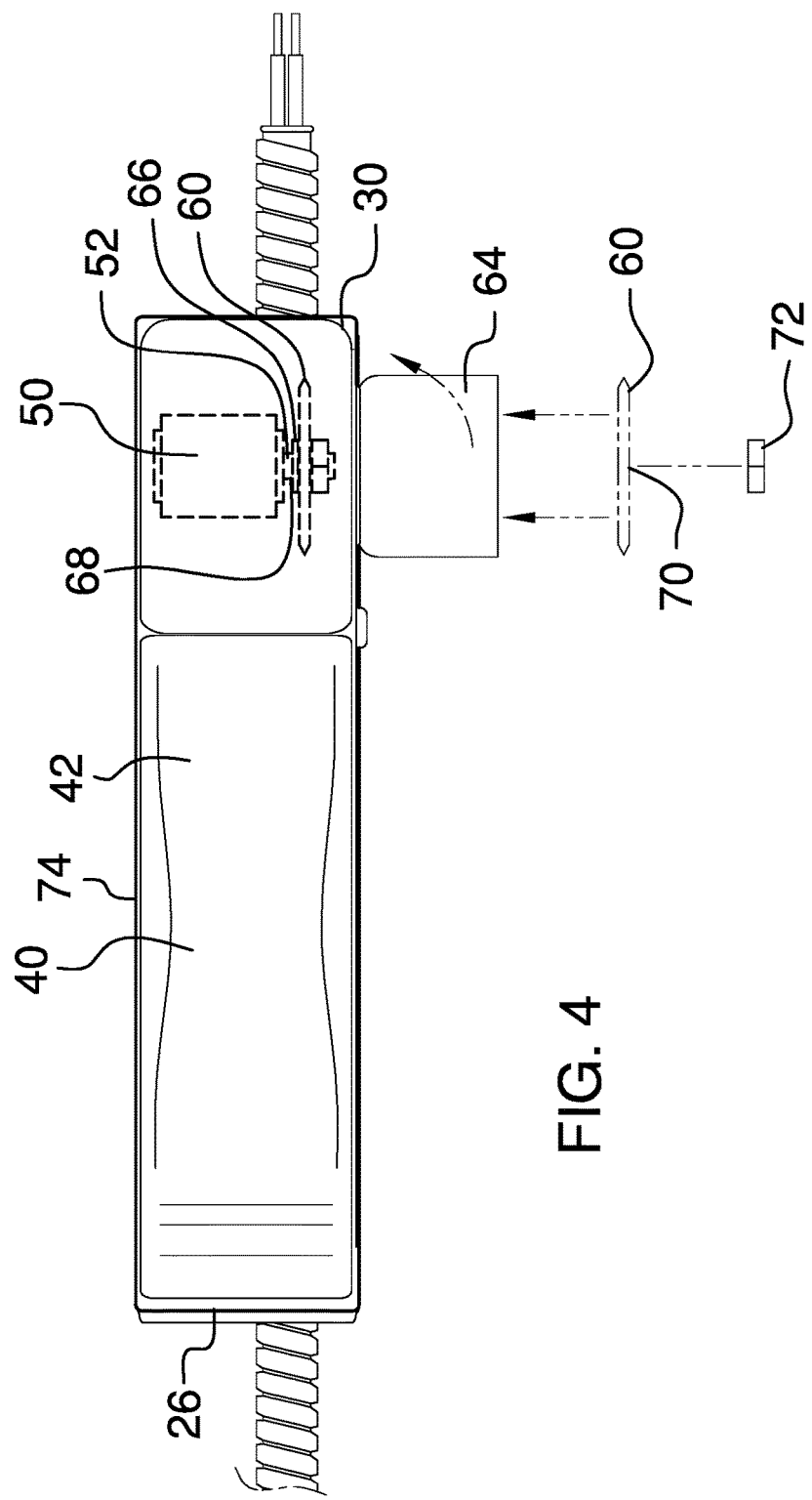
FIG. 4 is a top view of an embodiment of the disclosure.
Figure 5:
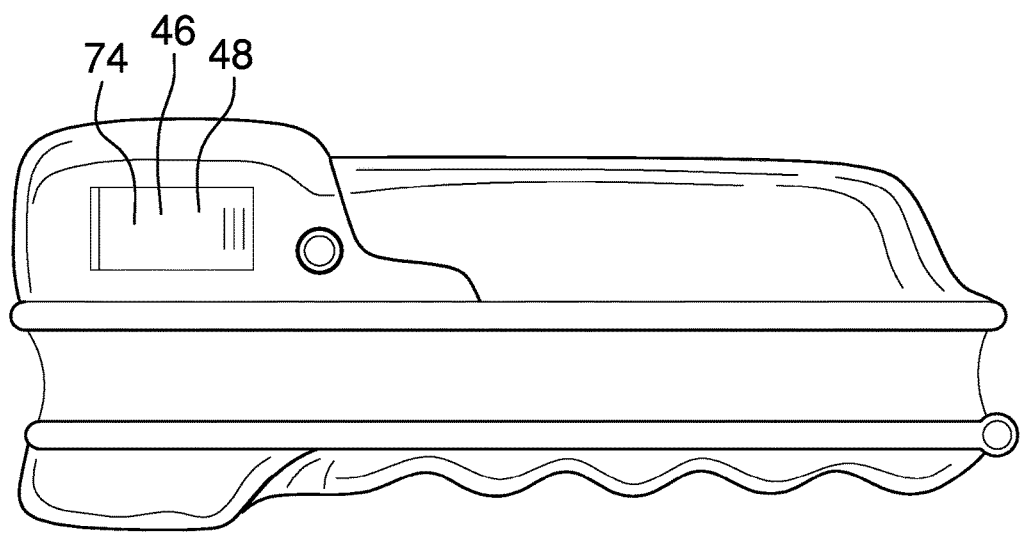
FIG. 5 is a side view of an embodiment of the disclosure.

With reference now to the drawings, and in particular to FIGS. 1 through 5 thereof, a new sawing device embodying the principles and concepts of an embodiment of the disclosure and generally designated by the reference numeral 10 will be described.

As best illustrated in FIGS. 1 through 5, the handheld circular sawing device 10 generally comprises a housing 12 that defines an internal space 14. A first plate 16 is coupled to and extends coplanarly with a first side 18 of the housing 12. A second plate 20 is positioned substantially perpendicular to the first plate 16 along a lower edge 22 of the first plate 16. The second plate 20 is hingedly coupled by a first end 24 to the first plate 16 proximate to a rear 26 of the housing 12. A second end 28 of the second plate 20 is positioned proximate to a front 30 of the housing 12. The first plate 16, the second plate 20 and a bottom 32 of the housing 12 define a channel 34. The channel 34 is configured to longitudinally position a section of a tubular substrate, such as armored cable and metal conduit. In one embodiment, the housing 12 is substantially rectangularly box shaped.

A first grip 36 is coupled to a lower face 38 of the second plate 20. A second grip 40 is coupled to a top 42 of the housing 12. The first grip 36 and the second grip 40 are configured to be grasped in a hand of a user to manipulate the housing 12 and the second plate 20 relative to the substrate that is positioned in the channel 34. In one embodiment, the first grip 36 and the second grip 40 comprise rubber. In another embodiment, the first grip 36 comprises a plurality of indentations 44. The indentations 44 are arcuate. In yet another embodiment, the plurality of indentations 44 comprises four indentations 44.

A power module 46 is coupled to the housing 12 and is positioned in the internal space 14. In one embodiment, the power module 46 comprises at least one battery 48. In another embodiment, the at least one battery 48 is rechargeable.

A motor 50 is coupled to the housing 12 and is positioned in the internal space 14. The motor 50 is operationally coupled to the power module 46. A shaft 52 is coupled to and extends from the motor 50. The motor 50 is positioned to rotate the shaft 52.

A controller 54 is coupled to the housing 12. The controller 54 is operationally coupled to the power module 46 and the motor 50. The controller 54 is positioned to selectively couple the motor 50 to the power module 46. In one embodiment, the controller 54 comprises a button 56 that is depressible. The button 56 is configured to be depressed to couple the motor 50 to the power module 46. In another embodiment, the controller 54 is positioned on a second side 58 of the housing 12.

A blade 60 is axially coupled to the shaft 52. The blade 60 is positioned on the shaft 52 so that the blade 60 protrudes through a slot 62 into the channel 34. The slot 62 is positioned longitudinally through the bottom 32 of the housing 12 proximate to the front 30 of the housing 12. The blade 60 is positioned to rotate coincident with the shaft 52 and is configured to longitudinally cut the substrate without damaging articles, such as wires, that are positioned within the substrate.

A first panel 64 is positioned in the second side 58 of the housing 12 proximate to the front 30. The first panel 64 is hingedly coupled to the housing 12. The first panel 64 is selectively positionable substantially perpendicular to the second side 58 so that the blade 60 and the shaft 52 are configured to be accessed by the user.

In one embodiment, the shaft 52 is threaded distal from the motor 50. A ring 66 is coupled to and extends radially from the shaft 52 proximate to a midpoint 68 of the shaft 52. A hole 70 is axially positioned in the blade 60. The hole 70 is positioned to insert the shaft 52 so that the blade 60 is positioned adjacent to the ring 66. A nut 72 that is complementary to the shaft 52 is positioned to threadedly couple to the shaft 52 to reversibly couple the blade 60 to the shaft 52.

A second panel 74 is positioned in the first side 18 of the housing 12 adjacent to the power module 46. The second panel 74 is reversibly couplable to the housing 12. The second panel 74 is configured to be opened to access the power module 46.

In use, the first grip 36 and the second grip 40 are configured to be grasped in the hand of the user to manipulate the housing 12 and the second plate 20 relative to the substrate that is positioned in the channel 34. The controller 54 is positioned to selectively couple the motor 50 to the power module 46. The blade 60 is positioned on the shaft 52 such that the blade 60 protrudes through the slot 62 into the channel 34. The blade 60 is positioned to rotate coincident with the shaft 52 and is configured to longitudinally cut the substrate without damaging the articles, such as the wires, that are positioned within the substrate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A handheld circular sawing device comprising:
    a housing defining an internal space;
    a first plate coupled to and extending coplanarly with a first side of said housing;
    a second plate positioned substantially perpendicular to said first plate along a lower edge of said first plate, said second plate being hingedly coupled by a first end to said first plate proximate to a rear of said housing such that a second end of said second plate is positioned proximate to a front of said housing and such that said first plate, said second plate and a bottom of said housing define a channel configured for longitudinal positioning of a section of a tubular substrate;
    a slot positioned longitudinally through said bottom of said housing proximate to said front of said housing;
    a power module coupled to said housing and positioned in said internal space;
    a motor coupled to said housing and positioned in said internal space, said motor being operationally coupled to said power module;
    a shaft coupled to and extending from said motor, wherein said shaft is positioned on said motor such that said motor is positioned for rotating said shaft;
    a blade axially coupled to said shaft; and
    wherein said blade is positioned on said shaft such that said blade protrudes through said slot into said channel and wherein said blade is positioned for rotating coincident with said shaft such that said blade is configured for longitudinally cutting the substrate without damaging articles positioned within the substrate.

2. The device of claim 1, further including said housing being substantially rectangularly box shaped.

3. The device of claim 1, further including a first grip coupled to a lower face of said second plate.

4. The device of claim 3, further including said first grip comprising a plurality of indentations, said indentations being arcuate.

5. The device of claim 4, further including said plurality of indentations comprising four said indentations.

6. The device of claim 3, further including a second grip coupled to a top of said housing, wherein said first grip is positioned on said second plate and said second grip is positioned on said housing such that said first grip and said second grip are configured for grasping in a hand of a user for manipulating said housing and said second plate relative to the substrate positioned in said channel.

7. The device of claim 6, further including said first grip and said second grip comprising rubber.

8. The device of claim 1, further including said power module comprising at least one battery.

9. The device of claim 8, further including said at least one battery being rechargeable.

10. The device of claim 1, further including a controller coupled to said housing, said controller being operationally coupled to said power module and said motor, wherein said controller is positioned in said housing such that said controller is positioned for selectively coupling said motor to said power module.

11. The device of claim 10, further including said controller comprising a button, said button being depressible, wherein said button is positioned in said housing such that said button is configured for depressing to couple said motor to said power module.

12. The device of claim 10, further including said controller being positioned on a second side of said housing.

13. The device of claim 1, further including a first panel positioned in a second side of said housing proximate to said front, said first panel being hingedly coupled to said housing such that said first panel is selectively positionable substantially perpendicular to said second side such that said blade and said shaft are configured for accessing by a user.

14. The device of claim 13, further comprising:
said shaft being threaded distal from said motor;
a ring coupled to and extending radially from said shaft proximate to a midpoint of said shaft;
a hole axially positioned in said blade;
a nut, said nut being complementary to said shaft; and
wherein said hole is positioned in said blade such that said hole is positioned for inserting said shaft such that said blade is positioned adjacent to said ring, wherein said blade is positioned on said shaft such that said nut is positioned for threadedly coupling to said shaft for reversibly coupling said blade to said shaft.

15. The device of claim 1, further including a panel positioned in said first side of said housing adjacent to said power module, said panel being reversibly couplable to said housing, wherein said panel is positioned in said housing such that said panel is configured to be opened for accessing said power module.

16. A handheld circular sawing device comprising:
a housing defining an internal space, said housing being substantially rectangularly box shaped;
a first plate coupled to and extending coplanarly with a first side of said housing;
a second plate positioned substantially perpendicular to said first plate along a lower edge of said first plate, said second plate being hingedly coupled by a first end to said first plate proximate to a rear of said housing such that a second end of said second plate is positioned proximate to a front of said housing and such that said first plate, said second plate and a bottom of said housing define a channel configured for longitudinal positioning of a section of a tubular substrate;
a first grip coupled to a lower face of said second plate, said first grip comprising a plurality of indentations, said indentations being arcuate, said plurality of indentations comprising four said indentations;
a second grip coupled to a top of said housing, wherein said first grip is positioned on said second plate and said second grip is positioned on said housing such that said first grip and said second grip are configured for grasping in a hand of a user for manipulating said housing and said second plate relative to the substrate positioned in said channel, said first grip and said second grip comprising rubber;
a slot positioned longitudinally through said bottom of said housing proximate to said front of said housing;
a power module coupled to said housing and positioned in said internal space, said power module comprising at least one battery, said at least one battery being rechargeable;
a motor coupled to said housing and positioned in said internal space, said motor being operationally coupled to said power module;
a shaft coupled to and extending from said motor, wherein said shaft is positioned on said motor such that said motor is positioned for rotating said shaft, said shaft being threaded distal from said motor;

a controller coupled to said housing, said controller being operationally coupled to said power module and said motor, wherein said controller is positioned in said housing such that said controller is positioned for selectively coupling said motor to said power module, said controller comprising a button, said button being depressible, wherein said button is positioned in said housing such that said button is configured for depressing to couple said motor to said power module, said controller being positioned on a second side of said housing;

a blade axially coupled to said shaft, wherein said blade is positioned on said shaft such that said blade protrudes through said slot into said channel and wherein said blade is positioned for rotating coincident with said shaft such that said blade is configured for longitudinally cutting the substrate without damaging articles positioned within the substrate;

a first panel positioned in said second side of said housing proximate to said front, said first panel being hingedly coupled to said housing such that said first panel is selectively positionable substantially perpendicular to said second side such that said blade and said shaft are configured for accessing by the user;

a ring coupled to and extending radially from said shaft proximate to a midpoint of said shaft;

a hole axially positioned in said blade, wherein said hole is positioned in said blade such that said hole is positioned for inserting said shaft such that said blade is positioned adjacent to said ring;

a nut, said nut being complementary to said shaft, wherein said blade is positioned on said shaft such that said nut is positioned for threadedly coupling to said shaft for reversibly coupling said blade to said shaft;

a second panel positioned in said first side of said housing adjacent to said power module, said second panel being reversibly couplable to said housing, wherein said second panel is positioned in said housing such that said second panel is configured to be opened for accessing said power module; and wherein said first grip is positioned on said second plate and said second grip is positioned on said housing such that said first grip and said second grip are configured for grasping in the hand of the user for manipulating said housing and said second plate relative to the substrate positioned in said channel, wherein said controller is positioned in said housing such that said controller is positioned for selectively coupling said motor to said power module, wherein said blade is positioned on said shaft such that said blade protrudes through said slot into said channel and wherein said blade is positioned for rotating coincident with said shaft such that said blade is configured for longitudinally cutting the substrate without damaging the articles positioned within the substrate.

* * * * *